(12) United States Patent
Shinohara

(10) Patent No.: US 11,884,289 B2
(45) Date of Patent: Jan. 30, 2024

(54) VEHICLE-BEHAVIOR NOTIFICATION DEVICE

(71) Applicant: SUBARU CORPORATION, Tokyo (JP)

(72) Inventor: Takeru Shinohara, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/835,092

(22) Filed: Jun. 8, 2022

(65) Prior Publication Data

US 2023/0001943 A1 Jan. 5, 2023

(30) Foreign Application Priority Data

Jul. 4, 2021 (JP) ................................. 2021-111174

(51) Int. Cl.
| | |
|---|---|
| *B60Q 1/00* | (2006.01) |
| *B60W 50/14* | (2020.01) |
| *B60W 40/114* | (2012.01) |

(52) U.S. Cl.
CPC .......... *B60W 50/14* (2013.01); *B60W 40/114* (2013.01); *B60W 2050/143* (2013.01); *B60W 2050/146* (2013.01); *B60W 2520/14* (2013.01); *B60W 2540/043* (2020.02); *B60W 2540/18* (2013.01)

(58) Field of Classification Search
CPC ............... B60W 50/14; B60W 40/114; B60W 2050/143; B60W 2050/146; B60W 2520/14; B60W 2540/043; B60W 2540/18
USPC ................. 340/439, 438, 425.5, 426.31, 465
See application file for complete search history.

(56) References Cited

U.S. PATENT DOCUMENTS

| | | | |
|---|---|---|---|
| 2009/0030572 A1 | 1/2009 | Takahashi et al. | |
| 2013/0226409 A1* | 8/2013 | Akiyama | ............ B60W 10/184 701/41 |
| 2014/0180538 A1* | 6/2014 | Mineo | .................... G01D 7/002 701/36 |
| 2016/0379389 A1* | 12/2016 | Fukada | .................. G09G 5/003 345/589 |
| 2017/0178507 A1* | 6/2017 | Yokochi | ........... G08G 1/096716 |
| 2019/0096247 A1* | 3/2019 | Yoshitomi | ............ G06V 20/582 |
| 2020/0369282 A1* | 11/2020 | Yokota | .................. B60W 50/14 |
| 2021/0094556 A1* | 4/2021 | Jordan | ............... B60W 50/045 |
| 2022/0063652 A1* | 3/2022 | Taylor | ................... B60W 30/17 |

FOREIGN PATENT DOCUMENTS

JP 2009-29181 A 2/2009

* cited by examiner

*Primary Examiner* — Anh V La
(74) *Attorney, Agent, or Firm* — TROUTMAN PEPPER HAMILTON SANDERS LLP

(57) ABSTRACT

A vehicle-behavior notification device includes a yaw rate detector and a notifier. The yaw rate detector is configured to detect a yaw rate of a vehicle body of a vehicle. The notifier is configured to notify a driver who drives the vehicle of the yaw rate detected by the yaw rate detector.

20 Claims, 9 Drawing Sheets

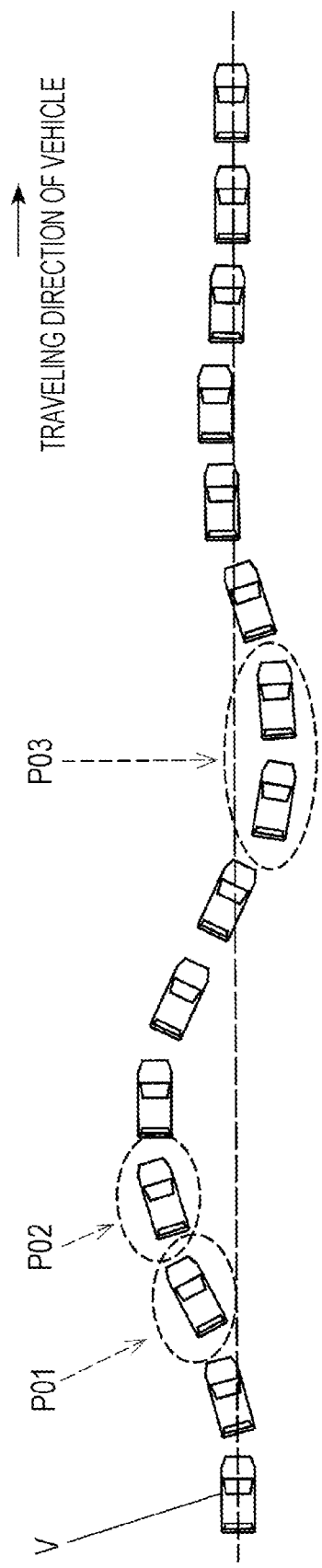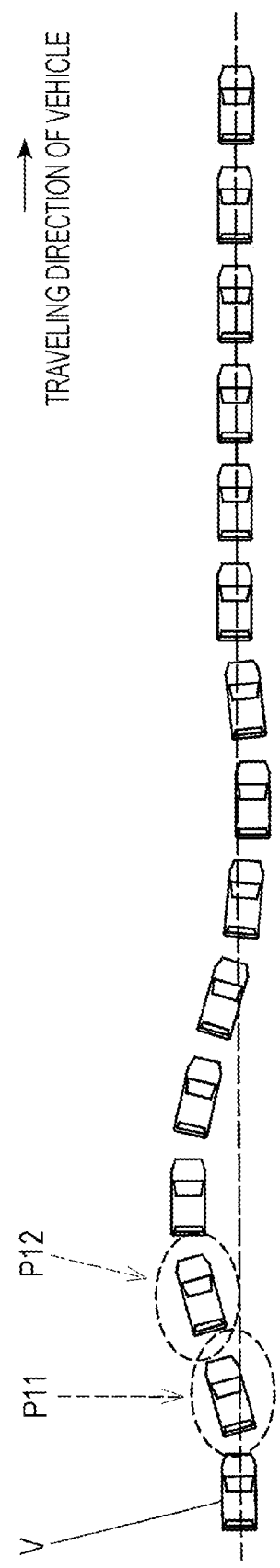

TRAVELING DIRECTION OF VEHICLE

TRAVELING DIRECTION OF VEHICLE

PATTERN A (WITH STEERING OPERATION)

PATTERN B (WITHOUT STEERING OPERATION)

PATTERN A (WITH STEERING OPERATION)

PATTERN B (WITHOUT STEERING OPERATION)

PATTERN A (WITH STEERING OPERATION)

PATTERN B (WITHOUT STEERING OPERATION)

VEHICLE-BEHAVIOR NOTIFICATION DEVICE

CROSS-REFERENCE TO RELATED APPLICATION

The present application claims priority from Japanese Patent Application No. 2021-111174 filed on Jul. 4, 2021, the entire contents of which are hereby incorporated by reference.

BACKGROUND

The disclosure relates to vehicle-behavior notification devices that are provided in vehicles, such as automobiles, and that notify drivers of vehicle-behavior-related information.

There have been proposed vehicles, such as automobiles, displaying vehicle-behavior-related information to occupants, such as drivers.

As a technique for displaying vehicle-behavior-related information, Japanese Unexamined Patent Application Publication No. 2009-29181 describes a turn-behavior display device provided in a vehicle having a turn behavior controller that controls a yaw moment of the vehicle in accordance with a torque difference between the left and right wheels of the vehicle. The turn-behavior display device displays an amount by which the yaw moment is controlled by the turn behavior controller.

SUMMARY

An aspect of the disclosure provides a vehicle-behavior notification device including a yaw rate detector and a notifier. The yaw rate detector is configured to detect a yaw rate of a vehicle body of a vehicle. The notifier is configured to notify a driver who drives the vehicle of the yaw rate detected by the yaw rate detector.

An aspect of the disclosure provides a vehicle-behavior notification device including a yaw rate sensor and circuitry. The yaw rate detector is configured to detect a yaw rate of a vehicle body of a vehicle. The circuitry is configured to notify a driver who drives the vehicle of the yaw rate detected by the yaw rate detector.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 5A and FIG. 5B schematically illustrate examples of vehicle behavior transition when the vehicle having the vehicle-behavior notification device according to the first embodiment and a vehicle according to a comparative example travel on a straight road;

DETAILED DESCRIPTION

In ordinary driving of an automobile, for example, a fine steering adjustment is often performed by setting the steering wheel to an angle of 5 degrees or smaller. Such a fine steering adjustment is performed more often as the speed increases.

A yaw rate occurring in the vehicle from such a fine steering-angle adjustment is often smaller than the lower limit for the yaw rate visually recognizable by the driver. For example, it is difficult for the driver to accurately ascertain vehicle behavior occurring at the initial stage of steering when the vehicle begins to make a turn or in a fine steering range of corrective steering when the vehicle is traveling on a straight road.

In such a case, although vehicle behavior occurs due to a fine steering-angle adjustment, the driver may falsely recognize that the vehicle behavior has not occurred. This may cause the driver to further perform an inappropriate operation, such as either of an excessive steering operation and a delay in steering back the steering wheel.

Such an inappropriate operation may cause the actual travel line to deviate from the travel line (i.e., travel path) intended by the driver, resulting in an increased frequency of steering performed by the driver and an occurrence of wobbling of the vehicle.

It is desirable to provide a vehicle-behavior notification device that notifies a driver of minute vehicle behavior that is difficult for the driver to visually recognize.

A vehicle-behavior notification device according to a first embodiment of the disclosure will be described below.

The vehicle-behavior notification device according to the first embodiment is equipped in an automobile, such as a car.

Figure 1:
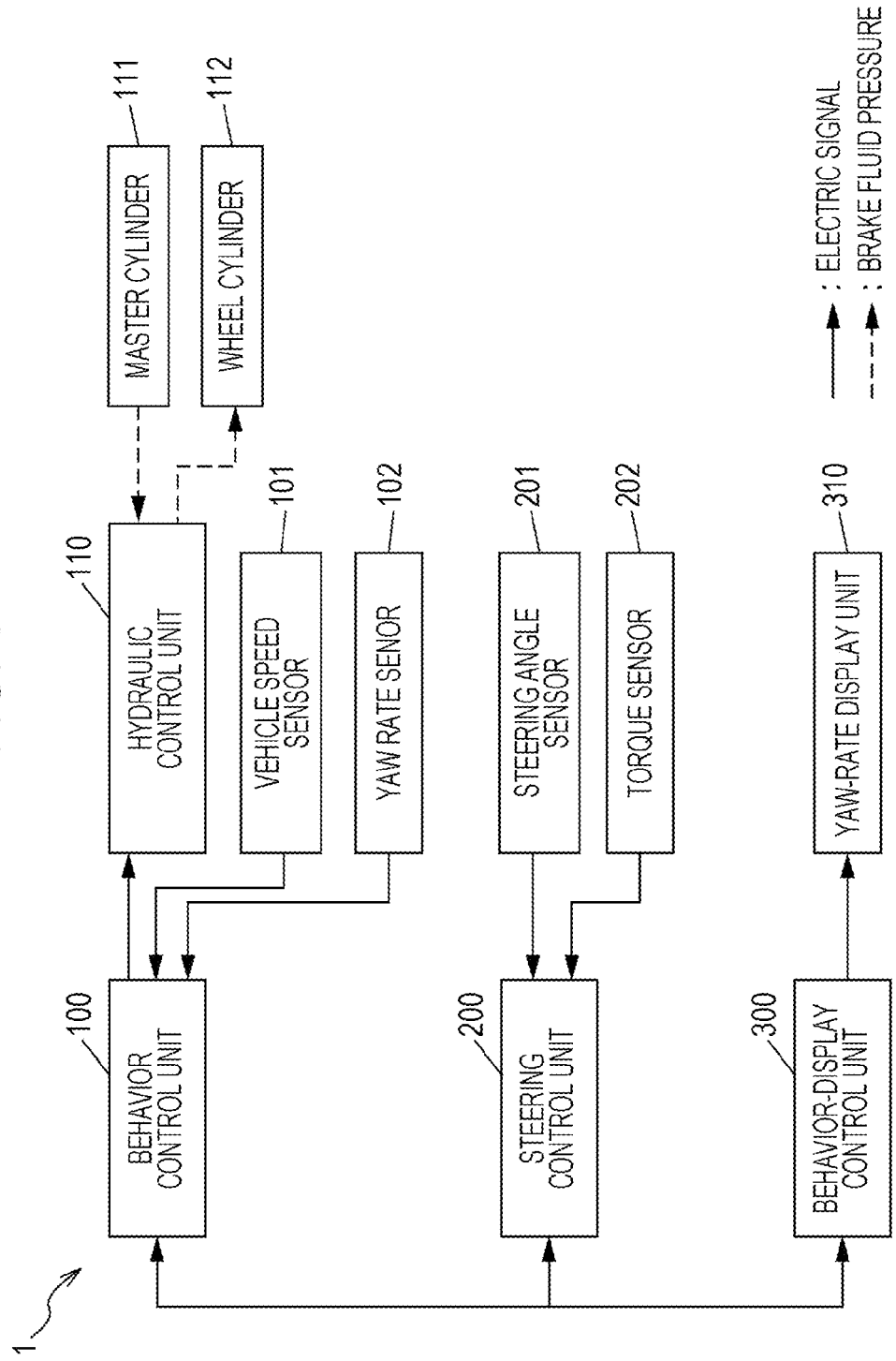
FIG. 1 is a block diagram schematically illustrating the configuration of a vehicle-behavior notification device according to an embodiment of the disclosure.

FIG. 1 is a block diagram schematically illustrating the configuration of the vehicle-behavior notification device according to the first embodiment.

A vehicle-behavior notification device 1 has a behavior control unit 100, a hydraulic control unit 110, a steering control unit 200, and a behavior-display control unit 300.

Each unit may be a microcomputer having, for example, an information processor, such as a central processing unit (CPU), storage units, such as a random access memory (RAM) and a read-only memory (ROM), an input/output interface, and a bus that couples these units to one another.

The units are capable of transmitting various kinds of information via a vehicular local area network (LAN), such as a controller-area-network (CAN) communication system, or by directly communicating with each other.

The behavior control unit 100 serves as a braking controller that controls hydraulic service brakes (i.e., braking devices) (not illustrated) provided for the individual wheels of the vehicle.

The behavior control unit 100 is capable of individually controlling the brake fluid pressures of wheel cylinders 112 of the individual wheels and causing the service brakes for the individual wheels to generate desired braking forces by giving a command to the hydraulic control unit 110.

The behavior control unit 100 is coupled to, for example, a vehicle speed sensor 101 and a yaw rate sensor 102.

The vehicle speed sensor 101 is configured to detect the rotational speed (i.e., wheel speed) of each wheel.

The yaw rate sensor 102 is configured to detect a yaw rate as a rotational speed around the vertical axis of the vehicle body.

An output from each of the vehicle speed sensor 101 and the yaw rate sensor 102 is to be used in, for example, antilock braking control and orientation stabilization control to be described below.

Antilock braking control involves, for example, reducing the brake fluid pressures on the wheels when wheel locking occurs during braking, so as to recover the rotation of the wheels.

Orientation stabilization control involves generating a braking-force difference between the left and right wheels when either of oversteer behavior and understeer behavior occurs in the vehicle, so as to generate a yaw moment in a direction for suppressing the behavior.

The behavior control unit 100 calculates a target yaw rate, serving as a yaw rate that may occur in the vehicle body during normal traveling, based on a steering angle of a steering device acquired from the steering control unit 200 and a vehicle speed detected by the vehicle speed sensor 101.

In accordance with a deviation between the actual yaw rate (i.e., real yaw rate) detected by the yaw rate sensor 102 and the target yaw rate, the behavior control unit 100 sets the direction and the magnitude of the yaw moment to be generated in the control of the braking forces.

The hydraulic control unit 110 is a hydraulic pressure controller that individually adjusts the brake fluid pressures of the wheel cylinders 112 of the individual wheels.

The hydraulic control unit 110 includes, for example, an electric pump for pressurizing the brake fluid, as well as a pressure increasing valve, a pressure reducing valve, and a pressure maintaining valve for controlling the brake fluid pressures of the wheel cylinders 112.

The hydraulic control unit 110 is coupled to, for example, a master cylinder 111 and the wheel cylinders 112 by using brake fluid pipes.

The master cylinder 111 pressurizes the brake fluid in accordance with an operation performed by the driver on the brake pedal (not illustrated) for a braking operation.

The brake fluid pressure generated by the master cylinder 111 is transmitted to each wheel cylinder 112 via the hydraulic control unit 110.

The hydraulic control unit 110 has a function for increasing and reducing the brake fluid pressures of the wheel cylinders 112 by increasing and reducing the brake fluid pressure generated by the master cylinder 111.

The wheel cylinders 112 are provided for the individual wheels and are each configured to generate a frictional force (i.e., braking force) according to the brake fluid pressure by, for example, pressing a brake pad against a disk rotor.

The steering control unit 200 is configured to control the steering device used for steering the front wheels serving as steering control wheels of the vehicle.

Figure 2:
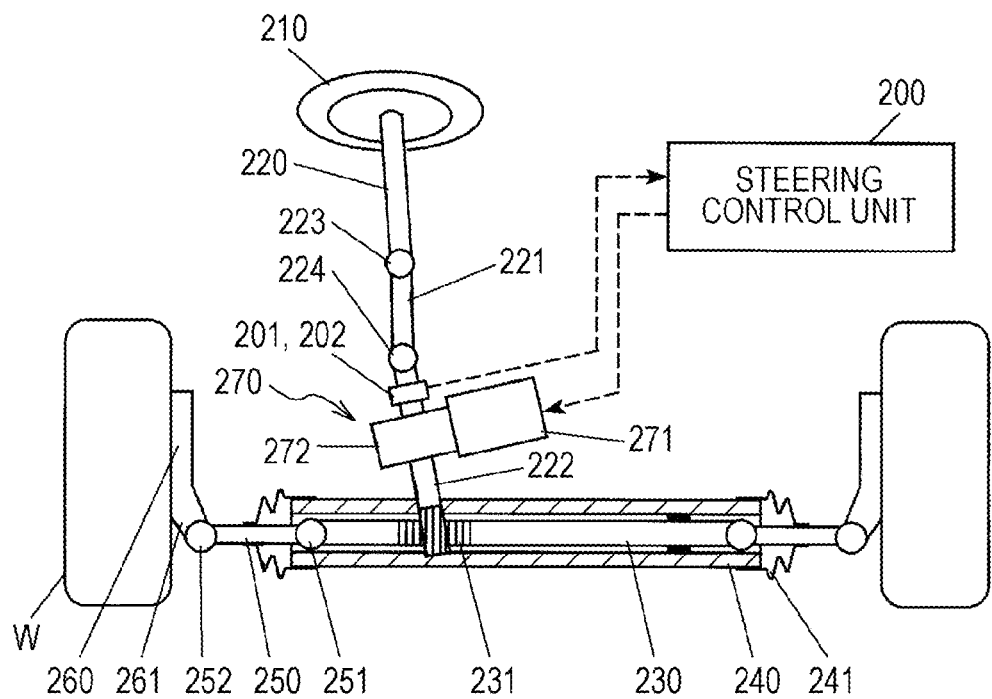
FIG. 2 schematically illustrates the configuration of a steering device of a vehicle according to the embodiment.

FIG. 2 schematically illustrates the configuration of the steering device of the vehicle according to the first embodiment.

The steering device includes, for example, a pinion-assisted electric power steering (EPS) device as a power assist mechanism.

The steering device has, for example, a steering wheel 210, a steering shaft 220, an intermediate shaft 221, a pinion shaft 222, a rack shaft 230, a rack housing 240, tie rods 250, housings 260, and an actuator unit 270.

The steering wheel 210 is a ring-shaped operational member to be rotated by the driver for inputting a steering operation.

The steering wheel 210 is disposed facing the driver seat inside the vehicle cabin.

The steering shaft 220 is a rotating shaft whose one end is attached to the steering wheel 210 and that transmits a rotational motion of the steering wheel 210 to a rack-and-pinion mechanism that converts the rotational motion into a translational motion in the vehicle-width direction.

The end of the steering shaft 220 opposite from the steering wheel 210 is sequentially coupled to the intermediate shaft 221 and the pinion shaft 222.

Universal joints (i.e., Cardan joints) 223 and 224 capable of transmitting rotation in state where the shafts are bent are provided between the steering shaft 220 and the intermediate shaft 221 as well as between the intermediate shaft 221 and the pinion shaft 222, respectively.

The distal end of the pinion shaft 222 is provided with a pinion gear that meshes with a rack gear 231 of the rack shaft 230 to drive the rack shaft 230.

The rack shaft 230 is a columnar member whose longitudinal direction (i.e., axial direction) is disposed parallel to the vehicle-width direction.

The rack shaft 230 is supported in a translationally movable manner in the vehicle-width direction relative to the vehicle body.

The rack shaft 230 is partially provided with the rack gear 231 that meshes with the pinion gear of the pinion shaft 222.

When the rack gear 231 is driven by the pinion gear in accordance with the rotation of the steering shaft 220, the rack shaft 230 moves translationally (i.e., rectilinearly) in the vehicle-width direction.

The rack housing 240 is a substantially cylindrical member that accommodates the rack shaft 230 while supporting the rack shaft 230 in a relatively shiftable manner in the vehicle-width direction.

The opposite ends of the rack housing 240 are provided with rack boots 241.

The rack boots 241 allow the tie rods 250 to shift relatively to the rack housing 240 while preventing foreign matter, such as dust, from entering the rack housing 240.

Each of the rack boots 241 is a flexible bellows tubular member composed of a resinous material, such as an elastomer.

Each tie rod 250 is a shaft-like interlocking member that couples an end of the rack shaft 230 to a knuckle arm 261 of the corresponding housing 260 and that rotates the housing 260 around a kingpin axis together with a translational motion of the rack shaft 230.

The inner end of the tie rod 250 in the vehicle-width direction is coupled to the end of the rack shaft 230 in a pivotable manner by using a ball joint 251.

The outer end of the tie rod 250 in the vehicle-width direction is coupled to the knuckle arm 261 of the housing 260 by using a ball joint 252.

The connection area between the tie rod 250 and the ball joint 252 is provided with a turn buckle mechanism for a toe-in adjustment.

Each housing (i.e., knuckle or upright) 260 accommodates a hub bearing that supports a corresponding wheel W in a rotatable manner around the axle.

The housing 260 has the knuckle arm 261 protruding forward or rearward relative to the axle.

The housing 260 is supported in a rotatable manner around a kingpin axis serving as a predetermined rotation center.

For example, if the vehicle has a MacPherson strut front suspension system, the kingpin axis is an imaginary shaft that couples the center of the bearing of the top strut mount and the center of the ball joint coupling the lower section of the housing 260 and the transverse link (i.e., lower arm).

The housing 260 is rotated around the kingpin axis by being pushed and pulled in the vehicle-width direction by the rack shaft 230 via the tie rod 250, whereby the wheel W is steered.

The actuator unit 270 is a driving device that rotationally drives the pinion shaft 222 to provide power assistance during hands-on driving and to perform a steering operation during automated driving.

The actuator unit 270 has, for example, a motor 271 and a gearbox 272.

The motor 271 is an electric actuator that generates a driving force to be applied to the steering shaft 220.

The rotational direction and the output torque of the motor 271 are controlled by the steering control unit 200.

The gearbox 272 includes a reduction gear train that reduces the rotation output (i.e., amplifies the torque) from the motor 271 and transmits the rotation output to the pinion shaft 222.

The steering control unit 200 is coupled to, for example, a steering angle sensor 201 and a torque sensor 202.

For example, the steering angle sensor 201 and the torque sensor 202 are integrated and are provided in a region of the pinion shaft 222 at the steering wheel 210 side relative to the actuator unit 270.

The steering angle sensor 201 has an angle encoder that detects a steering angle position (that is substantially equal to a rotational angle position of the steering wheel 210) of the pinion shaft 222.

The torque sensor 202 detects a torque (e.g., an input torque from the steering wheel 210) acting on the pinion shaft 222.

The behavior-display control unit 300 is configured to cause a yaw-rate display unit 310 to display the actual yaw rate (i.e., real yaw rate) of the vehicle body detected by the yaw rate sensor 102 in a predetermined display mode, where appropriate.

The yaw-rate display unit 310 is, for example, a display device (i.e., notifier) that is provided in an instrument panel within the vehicle cabin and that displays the magnitude and the direction of the yaw rate to the driver.

The functions of the behavior-display control unit 300 and the yaw-rate display unit 310 will be described in detail below.

Figure 3:
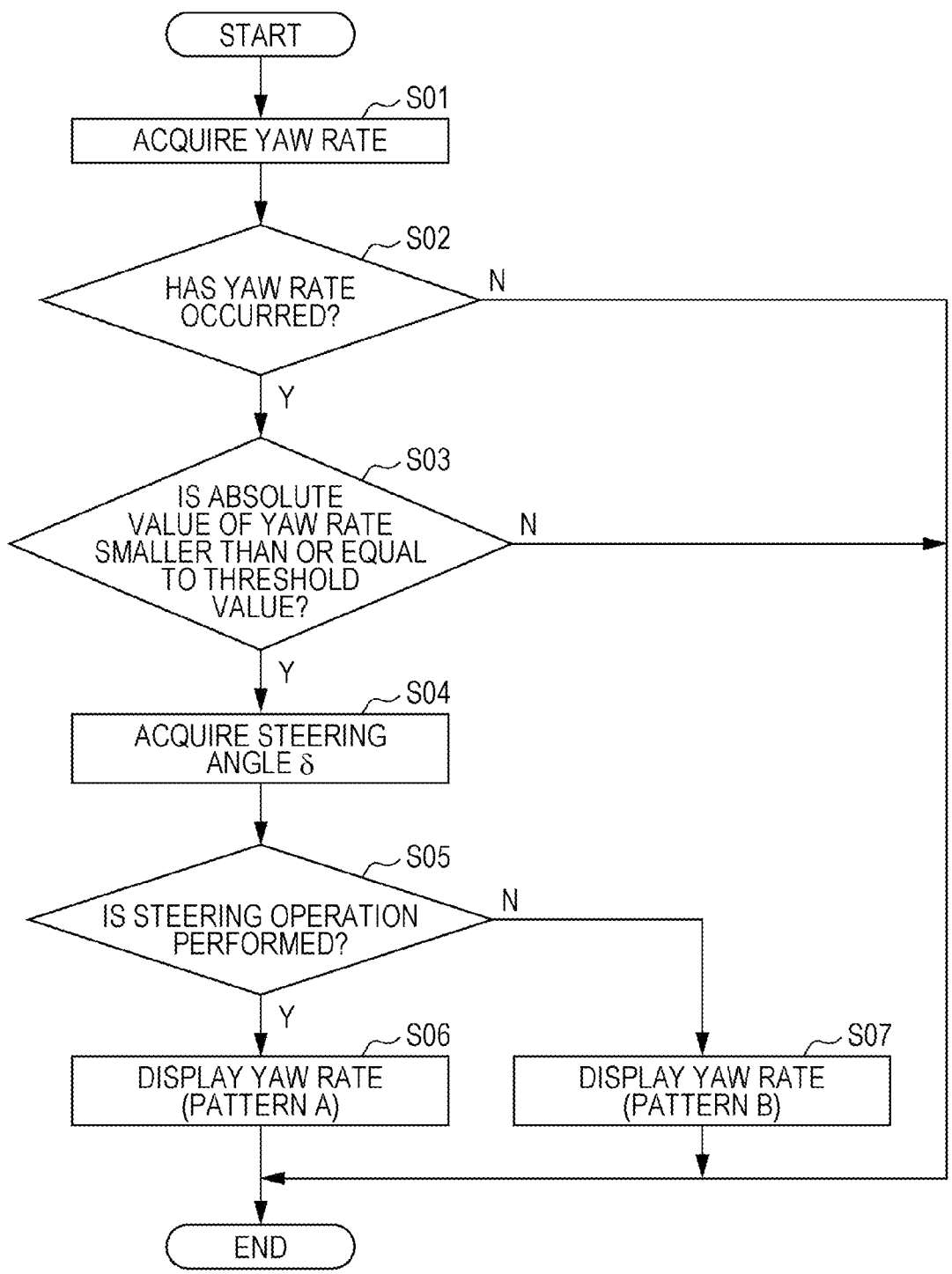
FIG. 3 is a flowchart illustrating the operation of the vehicle-behavior notification device according to the embodiment.

FIG. 3 is a flowchart illustrating the operation of the vehicle-behavior notification device according to the first embodiment.

The steps will be described below in a predetermined sequence.

In step S01, the behavior-display control unit 300 acquires, via the behavior control unit 100, information that is related to the yaw rate of the vehicle body and that is acquired by the yaw rate sensor 102.

The information related to the yaw rate includes information related to the magnitude (i.e., absolute value) and the direction (i.e., either of the clockwise direction and the counterclockwise direction in plan view of the vehicle) of the yaw rate.

Subsequently, the process proceeds to step S02.

In step S02, the behavior-display control unit 300 determines whether the absolute value of the yaw rate acquired in step S01 is larger than or equal to a predetermined lower limit value.

This lower limit value is set in view of a distinction between a state where a yaw rate has not occurred and a state where a yaw rate has occurred but is small enough to be negligible.

If a yaw rate with an absolute value larger than or equal to the lower limit value has occurred, the process proceeds to step S03. Otherwise (i.e., in a case where a yaw rate substantially has not occurred), the process ends (i.e., returns to the beginning).

In step S03, the behavior-display control unit 300 determines whether the absolute value of the yaw rate acquired in step S02 is smaller than or equal to a predetermined threshold value (i.e., an upper limit value at which the yaw rate is to be displayed).

This threshold value is set in view of a lower limit value for the yaw rate visually detectable based on, for example, the driver's forward view from the vehicle.

For example, the threshold value may be set between about 0.2 deg/sec and 0.5 deg/sec.

Since the lower limit value for the yaw rate visually detectable by the driver varies from individual to individual, the threshold value may be changed for each driver by using, for example, a driver monitoring system that uses a camera to capture an image of the driver and perform personal identification.

For example, if the driver has a high yaw-rate sensing capability, wobbling of the vehicle is suppressed when the vehicle travels on a straight road. Therefore, for example, if the driver during hands-on driving exhibits a small deviation in the lateral position within a lane successively detected by using, for example, an environment recognizer, such as a stereo camera, a learning correction can be performed to reduce the threshold value based on determination that the driver has a high yaw-rate sensing capability.

In one embodiment, the behavior-display control unit 300 may serve as a "threshold-value setting unit".

If the absolute value of the yaw rate is smaller than or equal to the threshold value, the process proceeds to step S04. Otherwise, the process ends (i.e., returns to the beginning).

In step S04, the behavior-display control unit 300 acquires, via the steering control unit 200, information related to a steering angle δ detected by the steering angle sensor 201.

Subsequently, the process proceeds to step S05.

In step S05, the behavior-display control unit 300 compares an absolute value of the steering angle δ acquired in step S04 with a predetermined value set in advance, so as to determine whether a steering operation has been performed by the driver.

This predetermined value is set in view of a distinction between a state where a steering operation has not been performed by the driver or is substantially negligible and a state where an active steering operation by the driver is detected.

For example, the predetermined value may be set in view of a steering angle occurring inevitably due to a force input from the road surface or due to shimmying of the steering system even when the driver is not performing a steering operation.

If the absolute value of the steering angle δ is larger than or equal to the predetermined value, the process proceeds to step S06. Otherwise, the process proceeds to step S07.

In step S06, the behavior-display control unit 300 causes the yaw-rate display unit 310 to display the magnitude and the direction of the current yaw rate.

The display mode in this case is a pattern A that is different from a pattern B to be described later.

The patterns A and B as the display modes will be described in detail later.

Subsequently, the process ends (i.e., returns to the beginning).

In step S07, the behavior-display control unit 300 causes the yaw-rate display unit 310 to display the magnitude and the direction of the current yaw rate.

The display mode in this case is the pattern B.

Subsequently, the process ends (i.e., returns to the beginning).

Figure 4A:
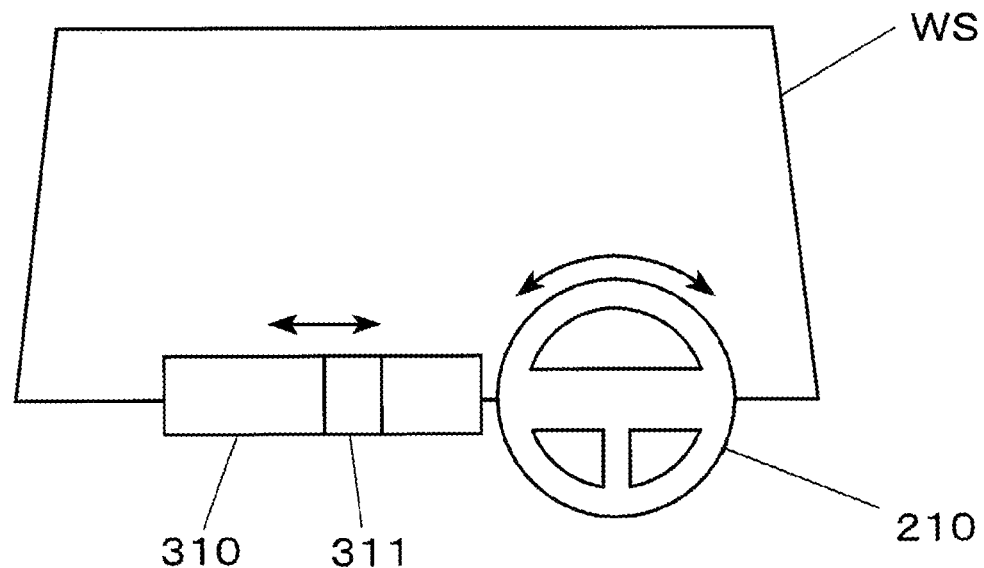
FIG. 4A and FIG. 4B schematically illustrate examples of yaw-rate notification modes in the vehicle-behavior notification device according to the embodiment.
Figure 4B:
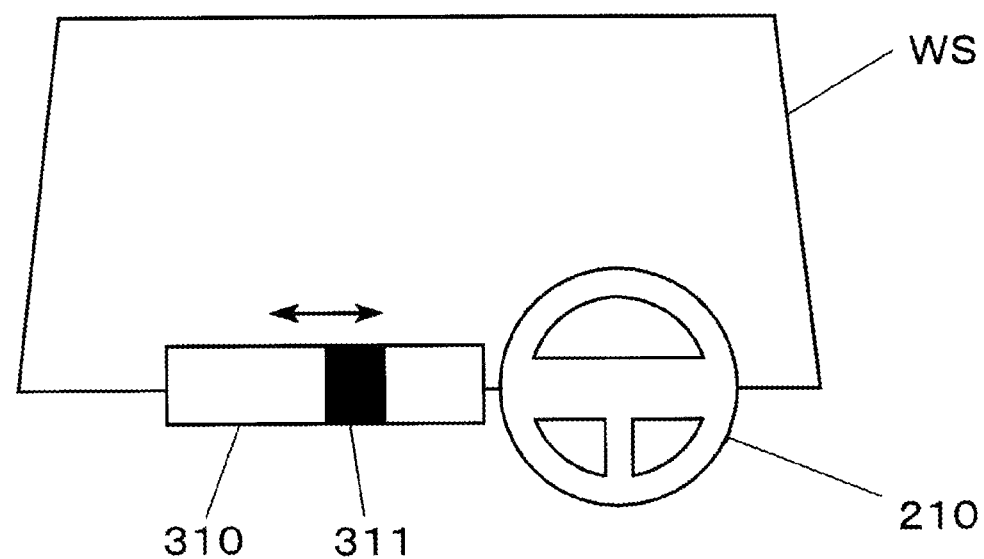

FIG. 4A and FIG. 4B schematically illustrate examples of yaw-rate notification modes in the vehicle-behavior notification device according to the first embodiment.

FIG. 4A and FIG. 4B illustrate the pattern A and the pattern B, respectively.

For example, the yaw-rate display unit 310 is provided near the lower edge of a windshield WS serving as a front glass window of the vehicle and may serve as a rectangular image display device whose longitudinal direction extends in the vehicle-width direction.

The yaw-rate display unit 310 has a function for displaying a yaw rate indicator 311.

The yaw rate indicator 311 is located at the center of the yaw-rate display unit 310 in the vehicle-width direction when the yaw rate is 0, and shifts in the vehicle-width direction when a yaw rate occurs.

The amount by which the yaw rate indicator 311 shifts from the center is correlated with the magnitude of the absolute value of the yaw rate, and may be, for example, proportional to the absolute value of the yaw rate.

Furthermore, the direction in which the yaw rate indicator 311 shifts from the center indicates the direction in which a yaw rate has occurred. In other words, the yaw rate indicator 311 shifts leftward from the center when a yaw rate occurs counterclockwise, and shifts rightward from the center when a yaw rate occurs clockwise.

By performing such display, the driver can quantitatively recognize a yaw rate together with the direction thereof.

In the first embodiment, the yaw rate indicator 311 is displayed in different display colors between the pattern A (i.e., when there is a steering operation) illustrated in FIG. 4A and the pattern B (i.e., when there is no steering operation) illustrated in FIG. 4B.

In the pattern B, it is often conceivable that the driver is not expecting an occurrence of a yaw rate. Thus, in order to highly alert the driver, the yaw rate indicator 311 is displayed using, for example, a warning color, such as any of red-based, orange-based, and yellow-based colors, or a color equivalent thereto.

On the other hand, in the pattern A, the yaw rate indicator 311 is displayed using a color, such as either of blue-based and green-based colors, instead of a warning color.

The effects of the above-described first embodiment of the disclosure will now be described in comparison to a comparative example to be described below.

A vehicle according to the comparative example is not equipped with the vehicle-behavior notification device according to the first embodiment.

In the vehicle according to the comparative example, the driver visually determines the yaw rate of the vehicle body from the forward view.

FIG. 5A and FIG. 5B schematically illustrate examples of vehicle behavior transition when the vehicle having the vehicle-behavior notification device according to the first embodiment and the vehicle according to the comparative example travel on a straight road.

FIG. 5A illustrates the behavior of the vehicle according to the comparative example, whereas FIG. 5B illustrates the behavior of the vehicle according to the first embodiment. The same applies to FIG. 6A and FIG. 6B to be described later.

In the comparative example illustrated in FIG. 5A, after a yaw rate occurs counterclockwise in a vehicle V due to, for example, a disturbance, the yaw rate is visually recognized by the driver at a position P01.

Subsequently, although the driver attempts to make a correction by steering rightward at a position P02, the timing for performing the corrective steering is late, as compared with the first embodiment, so that the amount of wobbling increases.

Moreover, since the driver's recognition of a clockwise yaw rate occurring due to this corrective steering is delayed, the driver may falsely recognize that behavior has not occurred and tend to excessively increase the steering angle for corrective steering. This may result in poor convergence, such as an occurrence of overshoot from the travel line to be returned to at a position P03.

In contrast, in the first embodiment illustrated in FIG. 5B, the driver recognizes the occurrence of the yaw rate at a position P11 earlier than at the position P01 in the comparative example, so that corrective steering can be performed earlier at a position P12, whereby the amount of wobbling of the vehicle decreases.

Moreover, since the yaw rate occurring due to corrective steering is recognized early by the driver, excessive corrective steering is suppressed, thereby achieving improved convergence.

Figure 6A:
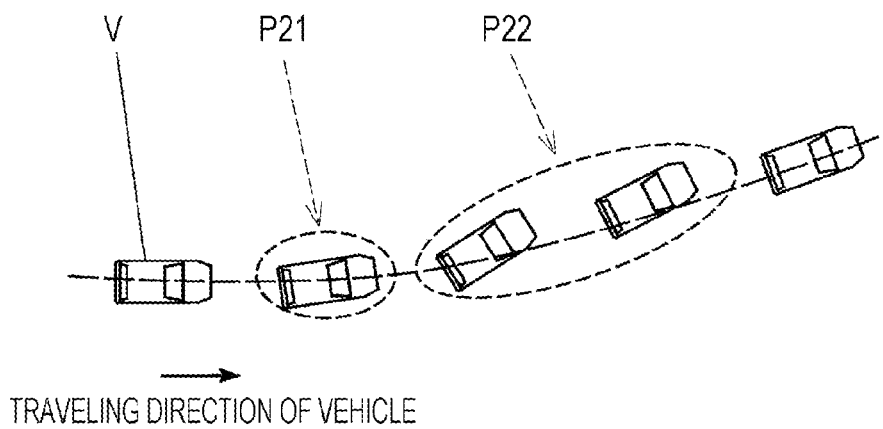
FIG. 6A and FIG. 6B schematically illustrate examples of vehicle behavior transition when the vehicle having the vehicle-behavior notification device according to the first embodiment and the vehicle according to the comparative example travel on a curved road.
Figure 6B:
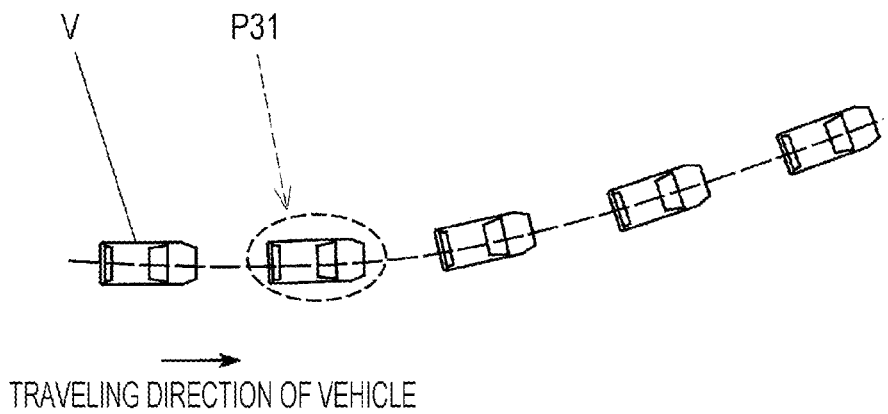

FIG. 6A and FIG. 6B schematically illustrate examples of vehicle behavior transition when the vehicle having the vehicle-behavior notification device according to the first embodiment and the vehicle according to the comparative example travel on a curved road.

In the comparative example illustrated in FIG. 6A, it is difficult for the driver to recognize vehicle behavior unless a yaw rate occurring in response to a steering operation input by the driver exceeds a minimal limit value for visual recognition.

Therefore, the driver may falsely recognize that vehicle behavior has not occurred in response to the steering operation and may perform excessive steering (e.g., increase the steering angle (of the steering wheel)) at, for example, a position P21 for inducing behavior.

Subsequently, although the driver may recognize the yaw rate, the excessive steering causes the travel line to deviate inward at a position P22 from the line intended by the driver, so that corrective steering is to be performed. This makes it difficult for the driver to trace the originally-intended line.

Furthermore, with an excessive increase or decrease in the steering angle that is originally not intended, the vehicle may possibly experience unstable orientation when turning.

In contrast, in the first embodiment illustrated in FIG. 6B, the driver can recognize early at, for example, a position P31 that behavior has occurred in the vehicle in response to the steering operation input thereto, so that an excessive steering operation is suppressed, whereby the driver can easily trace the intended line.

The first embodiment described above can achieve the following effects.
1. The yaw rate is quantitatively displayed to the driver, so that information related to the vehicle's yaw rate visually obtained normally from the driver's forward view can be obtained from the yaw-rate display unit 310, thereby enabling recognition of a minute yaw rate that is difficult for the driver to visually recognize.

With the recognition of minute vehicle behavior occurring in the vehicle, a steering operation suitable for the behavior can be input. Thus, an excessive steering operation and a delay in steering back the steering wheel can be prevented, and the frequency of steering operations performed by the driver and the wobbling of the vehicle when traveling straight can be reduced, so that the driver can easily trace the intended travel path.

2. If the absolute value of the yaw rate is larger than the threshold value and the driver is capable of recognizing the yaw rate from the forward view, the display of the yaw rate may be aborted, so that the driver can be guided to focus on the situation ahead of the vehicle.
3. The threshold value for the yaw rate display is varied depending on the driver, so that a threshold value appropriate for each driver is set in view of the fact that the visual yaw-rate sensing capability varies from driver to driver, thereby further enhancing the aforementioned effects.
4. If a yaw rate occurs due to a steering operation performed by the driver, the driver is expecting the occurrence of the yaw rate to a certain extent and can also predict the occurrence of the yaw rate from a reactive force from the steering wheel. However, for example, if a yaw rate occurs due to a disturbance, such as any of a crosswind, the road cant (i.e., a slope in the lane-width direction), and an irregular road surface, instead of a steering operation performed by the driver, it is difficult for the driver to expect the occurrence of the yaw rate.

With regard to this point, in this embodiment, the yaw rate indicator 311 is displayed in different colors in accordance with whether a steering operation is detected, so that the driver can be alerted about unexpected vehicle behavior.

5. If a yaw rate substantially has not occurred, the yaw rate display is not performed, so that the inconvenience that the driver may feel by being notified of unwanted information can be reduced.

As described above, this embodiment can provide a vehicle-behavior notification device that notifies a driver of minute vehicle behavior that is difficult for the driver to visually recognize.

Next, a vehicle-behavior notification device according to a second embodiment of the disclosure will be described.

In each of the embodiments to be described below, components identical to those in the previous embodiment or embodiments will be given the same reference signs, and descriptions thereof will be omitted. The following description mainly focuses on the differences from the previous embodiment or embodiments.

Figure 7A:
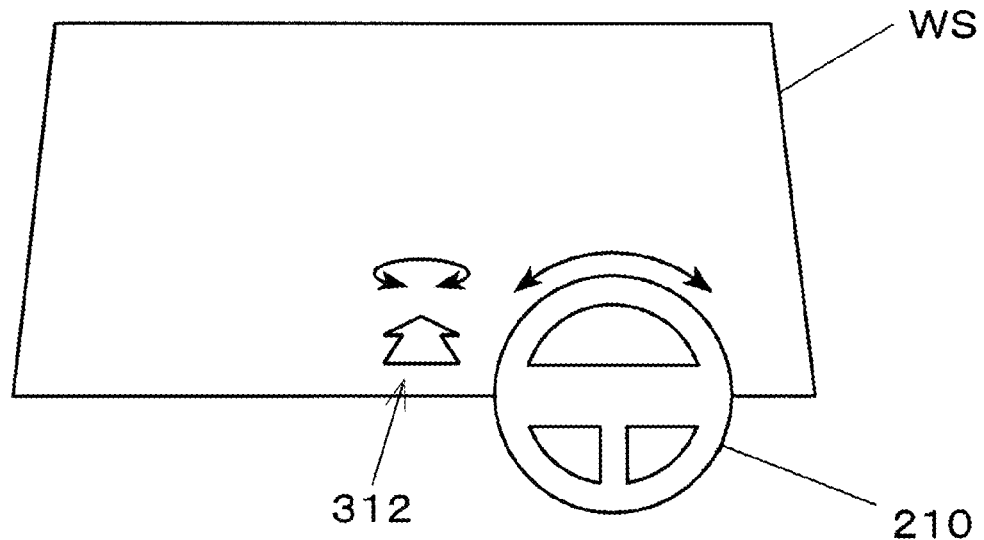
FIG. 7A and FIG. 7B schematically illustrate examples of yaw-rate notification modes in a vehicle-behavior notification device according to an embodiment of the disclosure.
Figure 7B:
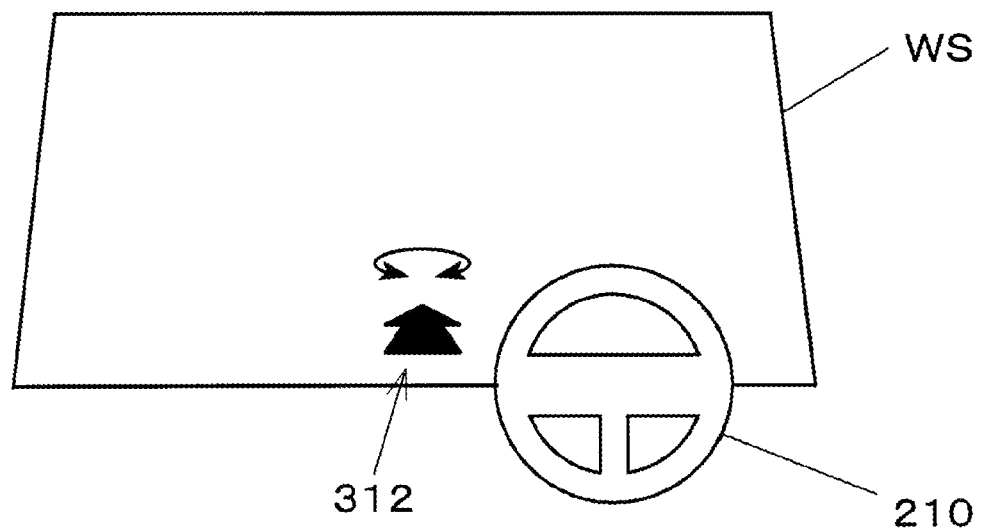

FIG. 7A and FIG. 7B schematically illustrate examples of yaw-rate notification modes in the vehicle-behavior notification device according to the second embodiment of the disclosure.

In the second embodiment, a head-up display (HUD) device (not illustrated) in place of the yaw-rate display unit 310 according to the first embodiment displays an image of a yaw rate indicator 312 in a lower area of the windshield WS.

For example, the yaw rate indicator 312 has a shape of an arrow pointing forward of the vehicle when a yaw rate has not occurred.

When a yaw rate occurs, the yaw rate indicator 312 displays the direction and the magnitude of the yaw rate in accordance with the rotational direction and the rotational angle, respectively, of the yaw rate indicator 312.

Similar to the yaw rate indicator 311 according to the first embodiment, the yaw rate indicator 312 is displayed in different colors between the pattern A and the pattern B.

In the second embodiment described above, effects similar to those in the first embodiment described above can be achieved.

Next, a vehicle-behavior notification device according to a third embodiment of the disclosure will be described.

Figure 8A:
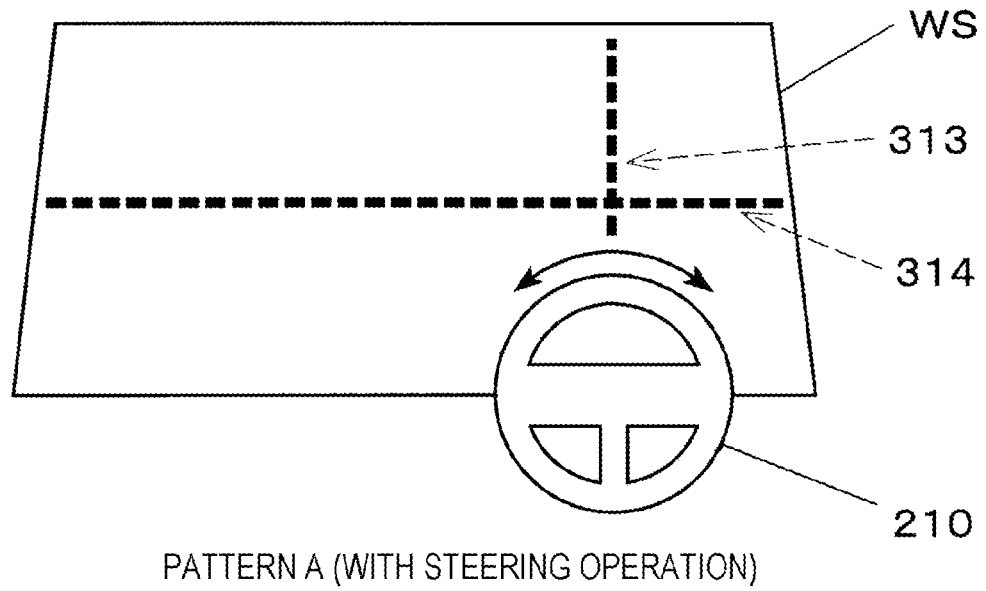
FIG. 8A and FIG. 8B schematically illustrate examples of yaw-rate notification modes in a vehicle-behavior notification device according to an embodiment of the disclosure.
Figure 8B:
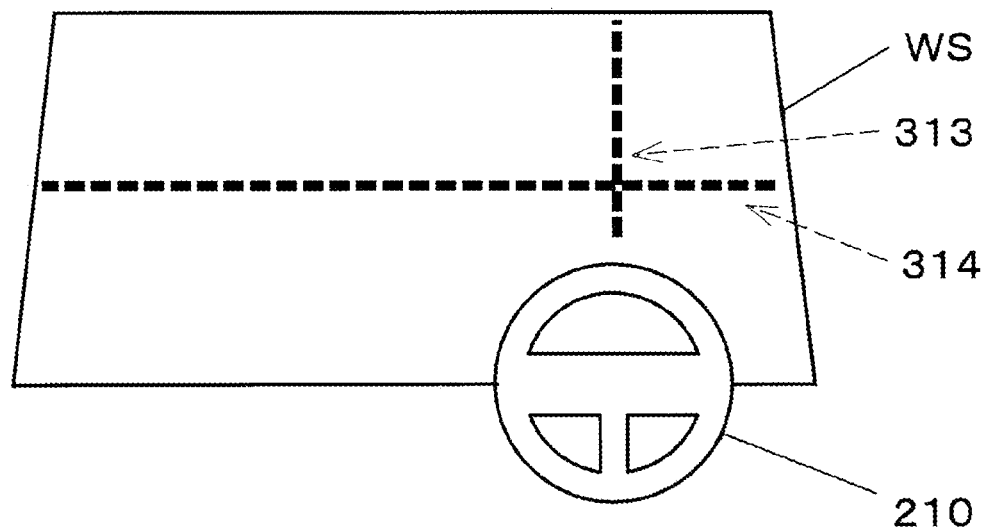

FIG. 8A and FIG. 8B schematically illustrate examples of yaw-rate notification modes in the vehicle-behavior notification device according to the third embodiment of the disclosure.

In the third embodiment, a head-up display device similar to that in the second embodiment displays a yaw rate indicator 313 and a pitch rate indicator 314 on the windshield WS.

For example, the yaw rate indicator 313 is displayed as a line extending in the vertical direction and is similar to the yaw rate indicator 311 according to the first embodiment in that the yaw rate indicator 313 indicates the direction and the magnitude of the yaw rate by moving leftward and rightward.

The pitch rate indicator 314 indicates information related to an angular velocity of behavior of the vehicle body in the pitch direction.

For example, the pitch rate indicator 314 is displayed as a line extending in the horizontal direction.

For example, when pitching behavior in the nosedive direction occurs in the vehicle body, the pitch rate indicator 314 moves downward from a predetermined neutral position in accordance with the magnitude of the angular velocity (i.e., the pitch rate) of the pitching behavior.

The yaw rate indicator 313 and the pitch rate indicator 314 are displayable in different colors between the patterns A and B.

In addition to effects similar to those of the first embodiment described above, the third embodiment described above enables the driver to recognize minute behavior of the vehicle multilaterally and intuitively by displaying the angular velocity (i.e., the pitch rate) of the pitching behavior.

Next, a vehicle-behavior notification device according to a fourth embodiment of the disclosure will be described.

In the fourth embodiment, a notification about the direction and the magnitude of a yaw rate is provided in the form of audio information by using an audio output device, such as either of a loudspeaker and a buzzer, in place of the yaw-rate display unit 310 according to the first embodiment.

For example, the notification may be provided by indicating the direction of the yaw rate in accordance with a tone, and indicating the magnitude of the yaw rate in accordance with any of the level of the tone, the sound volume thereof, and a change of the tone.

Furthermore, for example, the tone may be varied between the patterns A and B.

In addition to effects similar to those of the first embodiment described above, the fourth embodiment described above enables transmission of vehicle-behavior-related information even in a state where the driver is focusing on the situation ahead of the vehicle.

Next, a vehicle-behavior notification device according to a fifth embodiment of the disclosure will be described.

Figure 9A:
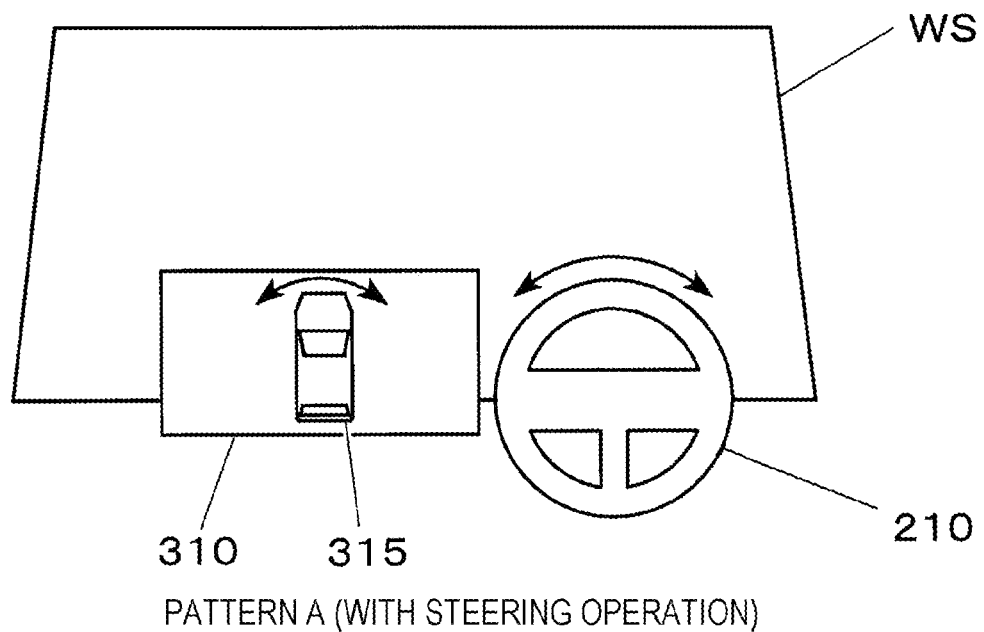
FIG. 9A and FIG. 9B schematically illustrate examples of yaw-rate notification modes in a vehicle-behavior notification device according to an embodiment of the disclosure.
Figure 9B:
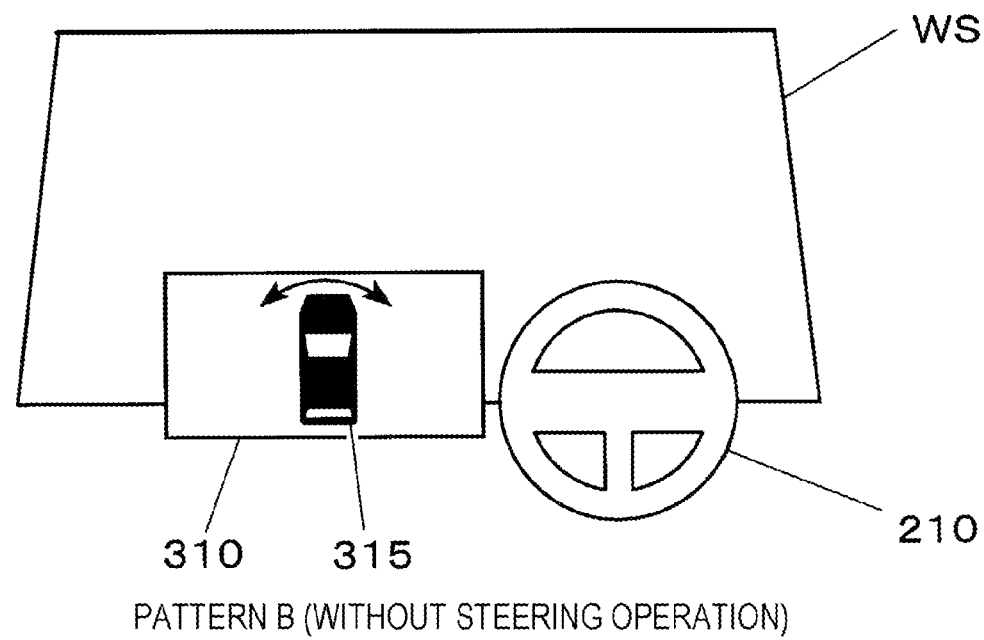

FIG. 9A and FIG. 9B schematically illustrate examples of yaw-rate notification modes in the vehicle-behavior notification device according to the fifth embodiment of the disclosure.

In the fifth embodiment, for example, an image schematically indicating either of a plan view and a bird's-eye view of the vehicle is displayed as a yaw rate indicator 315 on the yaw-rate display unit 310 serving as an image display unit, and the direction and the magnitude of a yaw rate are displayed in accordance with rotation of the yaw rate indicator 315, similar to the yaw rate indicator 312 according to the second embodiment.

Furthermore, similar to the first embodiment, the yaw rate indicator 315 may be displayed in different colors between the patterns A and B, or the pattern B alone may be provided with additional display for a certain kind of alert.

In addition to effects similar to those of the first embodiment described above, the fifth embodiment described above enables display of a yaw rate in accordance with rotation of the yaw rate indicator 315 mimicking the vehicle, so that even a driver with poor prior knowledge can intuitively ascertain the meaning of the display.

MODIFICATIONS

The embodiments of the disclosure are not limited to those described above and permit various modifications and alterations. Such modifications and alterations are within the technical scope of the embodiments of the disclosure.
1. The configurations of the vehicle-behavior notification device and the vehicle are not limited to those in the above embodiments and may be modified, where appropriate.
2. The display mode (i.e., the notification mode) in each embodiment is an example and may be changed, where appropriate, without being limited thereto. For example, as alternatives to the image display device and the head-up display device, measuring devices, such as a pointer device, and various kinds of display devices, such as a bar-graph display device having an array of a plurality of light emitters, such as light-emitting diodes (LEDs), may be used. Moreover, the audio-information-based notification as in the fourth embodiment may be performed in combination with visual display.
3. As an alternative to each of the embodiments in which it is determined whether a steering operation is performed by the driver based on a steering angle, the determination may be performed using another technique. For example, an output from a torque sensor that detects a steering torque may be used to determine whether a steering operation is performed.

The vehicle-behavior notification device 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle-behavior notification device 1 including the behavior control unit 100, the hydraulic control unit 110, the steering control unit 200, and the behavior-display control unit 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle-behavior notification device comprising:
a yaw rate detector configured to detect a yaw rate of a vehicle body of a vehicle;
a control unit configured to execute a comparison of an absolute value of the yaw rate with a first threshold value, the first threshold value indicating a visual yaw rate sensing capability of a driver who drives the vehicle; and
a notifier configured to notify the driver of the yaw rate detected by the yaw rate detector based on the comparison.

2. The vehicle-behavior notification device according to claim 1, wherein the notifier is configured to
provide a notification of the yaw rate in a case where the control unit determines that the absolute value of the yaw rate is smaller than a first threshold value; and
abort the notification of the yaw rate in a case where the control unit determines that the absolute value of the yaw rate is greater than the first threshold value.

3. The vehicle-behavior notification device according to claim 2, further comprising:
a driver identifier configured to identify the driver; and
a threshold-value setting unit configured to vary the first threshold value in a case the driver identified by the driver identifier changes.

4. The vehicle-behavior notification device according to claim 1, further comprising:
a steering-operation detector configured to detect a steering operation performed by the driver,
wherein the notifier is configured to change a notification mode for notifying the yaw rate in accordance with whether the steering operation is detected.

5. The vehicle-behavior notification device according to claim 2, further comprising:
a steering-operation detector configured to detect a steering operation performed by the driver,
wherein the notifier is configured to change a notification mode for notifying the yaw rate in accordance with whether the steering operation is detected.

6. The vehicle-behavior notification device according to claim 3, further comprising:
a steering-operation detector configured to detect a steering operation performed by the driver,
wherein the notifier is configured to change a notification mode for notifying the yaw rate in accordance with whether the steering operation is detected.

7. The vehicle-behavior notification device according to claim 1,
wherein the notifier is configured to stop notifying the yaw rate in a case where an absolute value of the yaw rate is smaller than or equal to a predetermined lower limit value.

8. The vehicle-behavior notification device according to claim 2,
wherein the notifier is configured to stop notifying the yaw rate in a case where the absolute value of the yaw rate is smaller than or equal to a predetermined lower limit value.

9. The vehicle-behavior notification device according to claim 3,
wherein the notifier is configured to stop notifying the yaw rate in a case where the absolute value of the yaw rate is smaller than or equal to a predetermined lower limit value.

10. The vehicle-behavior notification device according to claim 4,
wherein the notifier is configured to stop notifying the yaw rate in a case where an absolute value of the yaw rate is smaller than or equal to a predetermined lower limit value.

11. The vehicle-behavior notification device according to claim 5,
wherein the notifier is configured to stop notifying the yaw rate in a case where the absolute value of the yaw rate is smaller than or equal to a predetermined lower limit value.

12. The vehicle-behavior notification device according to claim 6,
wherein the notifier is configured to stop notifying the yaw rate in a case where the absolute value of the yaw rate is smaller than or equal to a predetermined lower limit value.

13. The vehicle-behavior notification device according to claim 1, wherein the first threshold value is a value between 0.2 deg/sec and 0.5 deg/sec.

14. The vehicle-behavior notification device according to claim 1,
wherein the notifier is configured to notify a magnitude and a direction of the yaw rate, and
wherein the magnitude represents the absolute value of the yaw rate, and the direction of the yaw rate represents either one of a clockwise direction and a counterclockwise direction in a plan view of the vehicle.

15. The vehicle-behavior notification device according to claim 1, wherein the control unit is further configured to
cause, based on determining that the absolute value of the yaw rate is smaller than the first threshold value and determining that an absolute value of a steering angle of the vehicle is larger than a second threshold value, the notifier to display a yaw rate indicator indicating at least one of a magnitude of the yaw rate and a direction of the yaw rate in a first display color,
cause, based on determining that the absolute value of the yaw rate is smaller than the first threshold value and determining that an absolute value of a steering angle of the vehicle is smaller than the second threshold value, the notifier to display the yaw rate indicator in a second display color different from the first display color, and
cause, based on determining that the absolute value of the yaw rate is larger than the first threshold value, the notifier to abort to display the yaw rate indicator.

16. A vehicle-behavior notification device comprising:
a yaw rate sensor configured to detect a yaw rate of a vehicle body of a vehicle; and
circuitry configured to
execute a comparison of an absolute value of the yaw rate with a first threshold value, the first threshold value indicating a visual yaw rate sensing capability of a driver who drives the vehicle; and
notify the driver of the yaw rate detected by the yaw rate detector based on the comparison.

17. The vehicle-behavior notification device according to claim 16, wherein the circuitry is configured to
provide a notification of the yaw rate in a case where the circuitry determines that the absolute value of the yaw rate is smaller than the first threshold value, and
abort the notification of the yaw rate in a case where the circuitry determines that the absolute value of the yaw rate is greater than the first threshold value.

18. The vehicle-behavior notification device according to claim 16, wherein the first threshold value is a value between 0.2 deg/sec and 0.5 deg/sec.

19. The vehicle-behavior notification device according to claim 16,
wherein the notifier is configured to notify a magnitude and a direction of the yaw rate, and
wherein the magnitude represents the absolute value of the yaw rate, and the direction of the yaw rate represents either one of a clockwise direction and a counterclockwise direction in a plan view of the vehicle.

20. The vehicle-behavior notification device according to claim 16, wherein the circuitry is further configured to
cause, based on determining that the absolute value of the yaw rate is smaller than the first threshold value and determining that an absolute value of a steering angle of the vehicle is larger than a second threshold value, the notifier to display a yaw rate indicator indicating at least one of a magnitude of the yaw rate and a direction of the yaw rate in a first display color,
cause, based on determining that the absolute value of the yaw rate is smaller than the first threshold value and determining that an absolute value of a steering angle of the vehicle is smaller than the second threshold value, the notifier to display the yaw rate indicator in a second display color different from the first display color, and
cause, based on determining that the absolute value of the yaw rate is larger than the first threshold value, the notifier to abort to display the yaw rate indicator.

* * * * *